United States Patent
Yuan et al.

(10) Patent No.: US 11,765,584 B2
(45) Date of Patent: Sep. 19, 2023

(54) MESSAGE PROCESSING METHOD AND SYSTEM, AND USER PLANE FUNCTION DEVICE

(71) Applicant: HUAWEI TECHNOLOGIES CO., LTD., Shenzhen (CN)

(72) Inventors: Liping Yuan, Beijing (CN); Chunlei Zhang, Shanghai (CN); Xi Chen, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 285 days.

(21) Appl. No.: 17/010,055

(22) Filed: Sep. 2, 2020

(65) Prior Publication Data

US 2020/0404497 A1 Dec. 24, 2020

Related U.S. Application Data

(63) Continuation of application No. PCT/CN2019/076832, filed on Mar. 4, 2019.

(30) Foreign Application Priority Data

Mar. 5, 2018 (CN) .......................... 201810179465.6

(51) Int. Cl.
*H04W 12/06* (2021.01)
*H04W 36/00* (2009.01)
(Continued)

(52) U.S. Cl.
CPC .......... *H04W 12/06* (2013.01); *H04W 12/72* (2021.01); *H04W 36/0011* (2013.01); *H04W 36/12* (2013.01); *H04W 84/042* (2013.01)

(58) Field of Classification Search
None
See application file for complete search history.

(56) References Cited

U.S. PATENT DOCUMENTS 9,769,668 B1 * 9/2017 Cui ..................... H04M 15/857
10,785,652 B1 * 9/2020 Ravindranath ....... H04W 12/48
(Continued)

FOREIGN PATENT DOCUMENTS

CN 102256348 A 11/2011
CN 105357774 A 2/2016
(Continued)

OTHER PUBLICATIONS

ETSI et al ("ETSI," ETSI GS MEC 002 V1.1.1 (Mar. 2016), Group Specification, Mobile Edge Computing (MEC) Technical Requirements, pp. 1-40). (Year: 2016).*
(Continued)

*Primary Examiner* — Luu T Pham
*Assistant Examiner* — James J Wilcox
(74) *Attorney, Agent, or Firm* — Rimon PC

(57) ABSTRACT

This application provides a message processing method and system, and a user plane function UPF device. The method includes: receiving user equipment (UE) authentication information sent by a session management function (SMF) device; matching a received uplink message of the UE with the UE authentication information, and if the matching succeeds, sending the uplink message that includes the UE authentication information to a first application (APP); and performing authentication by the first APP on the UE according to the UE authentication information. In the foregoing process, authentication on the UE does not need to be performed by a remote APP. This simplifies the authentication process, reduces network resource overhead, speeds up authentication on UEs, reduces the latency of UE authentication, and further increases the application switching speed.

9 Claims, 6 Drawing Sheets

(51) Int. Cl.
*H04W 12/72* (2021.01)
*H04W 36/12* (2009.01)
*H04W 84/04* (2009.01)

(56) References Cited

U.S. PATENT DOCUMENTS

| | | | | |
|---|---|---|---|---|
| 10,973,040 | B2* | 4/2021 | Talebi Fard | H04W 72/1263 |
| 11,405,834 | B2* | 8/2022 | Deng | H04W 36/32 |
| 11,483,685 | B2* | 10/2022 | Libby | H04M 15/41 |
| 11,528,756 | B2* | 12/2022 | Jeong | H04W 24/02 |
| 11,564,157 | B2* | 1/2023 | Li | H04W 8/18 |
| 2002/0044552 | A1* | 4/2002 | Vialen | H04W 12/037 |
| | | | | 370/252 |
| 2007/0022476 | A1* | 1/2007 | Bae | H04W 12/069 |
| | | | | 726/15 |
| 2007/0130471 | A1* | 6/2007 | Walker Pina | H04W 12/06 |
| | | | | 713/182 |
| 2008/0108322 | A1* | 5/2008 | Upp | H04L 63/0892 |
| | | | | 455/411 |
| 2008/0167003 | A1* | 7/2008 | Wang | H04W 12/0433 |
| | | | | 455/411 |
| 2008/0318552 | A1* | 12/2008 | Harms | H04W 12/06 |
| | | | | 455/411 |
| 2011/0182193 | A1* | 7/2011 | Dwyer | H04W 52/0206 |
| | | | | 370/252 |
| 2011/0307694 | A1* | 12/2011 | Broustis | H04L 63/0884 |
| | | | | 713/169 |
| 2012/0039323 | A1* | 2/2012 | Hirano | H04W 76/12 |
| | | | | 370/338 |
| 2012/0131329 | A1* | 5/2012 | Liang | H04L 63/0892 |
| | | | | 713/151 |
| 2013/0176897 | A1* | 7/2013 | Wang | H04W 48/08 |
| | | | | 370/254 |
| 2013/0211933 | A1* | 8/2013 | Yoo | G06Q 20/20 |
| | | | | 705/16 |
| 2013/0336258 | A1* | 12/2013 | Young | H04W 72/02 |
| | | | | 370/329 |
| 2015/0181441 | A1* | 6/2015 | Bindrim | H04L 67/10 |
| | | | | 370/328 |
| 2015/0181467 | A1* | 6/2015 | Bindrim | H04L 45/308 |
| | | | | 370/235 |
| 2016/0087948 | A1* | 3/2016 | Arunachalam | H04W 12/10 |
| | | | | 713/181 |
| 2016/0182477 | A1* | 6/2016 | Zhang | H04L 63/062 |
| | | | | 726/7 |
| 2016/0241349 | A1* | 8/2016 | Lu | H04L 43/16 |
| 2016/0302063 | A1* | 10/2016 | Ahmed | H04W 36/08 |
| 2017/0012778 | A1* | 1/2017 | Choyi | H04L 9/3242 |
| 2017/0026832 | A1* | 1/2017 | Chang | H04W 12/062 |
| 2017/0195891 | A1* | 7/2017 | Smith | H04W 24/02 |
| 2017/0264439 | A1* | 9/2017 | Muhanna | H04W 12/02 |
| 2018/0013568 | A1* | 1/2018 | Muhanna | H04L 9/0825 |
| 2018/0167813 | A1* | 6/2018 | Li | H04L 63/126 |
| 2018/0183855 | A1* | 6/2018 | Sabella | H04W 52/0264 |
| 2018/0198715 | A1* | 7/2018 | Shmilovici | H04L 47/127 |
| 2018/0270877 | A1* | 9/2018 | Lee | H04W 76/30 |
| 2018/0278622 | A1* | 9/2018 | Peng | H04L 9/0643 |
| 2019/0037629 | A1* | 1/2019 | Ryu | H04W 76/27 |
| 2019/0044932 | A1* | 2/2019 | Kumar | H04L 63/08 |
| 2019/0141527 | A1* | 5/2019 | Krishan | H04W 12/06 |
| 2019/0149997 | A1* | 5/2019 | Liao | H04W 76/27 |
| | | | | 455/411 |
| 2019/0215724 | A1* | 7/2019 | Talebi Fard | H04W 48/16 |
| 2019/0387401 | A1* | 12/2019 | Liao | H04W 28/0289 |
| 2020/0008264 | A1* | 1/2020 | Kang | H04W 36/0033 |
| 2020/0084829 | A1* | 3/2020 | Tang | H04L 67/143 |
| 2020/0107225 | A1* | 4/2020 | Zhang | H04W 28/085 |
| 2020/0245135 | A1* | 7/2020 | Phuyal | H04W 12/106 |
| 2020/0252813 | A1* | 8/2020 | Li | G06Q 20/382 |
| 2020/0280435 | A1* | 9/2020 | Lehtovirta | H04L 9/0822 |
| 2020/0344656 | A1* | 10/2020 | Chen | H04W 8/06 |
| 2020/0374839 | A1* | 11/2020 | Novlan | H04W 72/04 |
| 2020/0404497 | A1* | 12/2020 | Yuan | H04W 12/06 |
| 2021/0014720 | A1* | 1/2021 | Li | H04W 36/0011 |
| 2021/0076209 | A1* | 3/2021 | Suh | H04W 12/106 |
| 2021/0112408 | A1* | 4/2021 | Pazhyannur | H04W 12/06 |
| 2021/0112409 | A1* | 4/2021 | Rune | H04L 63/0884 |
| 2021/0144548 | A1* | 5/2021 | Ben Henda | H04W 12/106 |
| 2021/0144630 | A1* | 5/2021 | Wang | H04W 76/15 |
| 2021/0153070 | A1* | 5/2021 | Velev | H04W 28/0268 |
| 2021/0185521 | A1* | 6/2021 | Purkayastha | H04W 76/25 |
| 2021/0281438 | A1* | 9/2021 | Meredith | H04L 12/5692 |
| 2021/0314266 | A1* | 10/2021 | Li | H04L 47/20 |
| 2021/0400576 | A1* | 12/2021 | Lee | H04W 48/18 |
| 2022/0007251 | A1* | 1/2022 | Allan | H04W 36/32 |
| 2022/0060897 | A1* | 2/2022 | Bartolomé Rodrigo | H04W 12/06 |
| 2022/0109622 | A1* | 4/2022 | Yeh | H04L 69/22 |
| 2022/0159460 | A1* | 5/2022 | Ben Henda | H04W 12/041 |
| 2022/0167458 | A1* | 5/2022 | Shrestha | H04W 76/20 |
| 2022/0174759 | A1* | 6/2022 | Lee | H04L 67/14 |
| 2022/0191694 | A1* | 6/2022 | Rajput | H04W 12/0433 |
| 2022/0240087 | A1* | 7/2022 | Balmakhtar | H04L 9/3213 |
| 2022/0345453 | A1* | 10/2022 | Van Duren | H04W 4/40 |
| 2022/0360580 | A1* | 11/2022 | Mishra | H04W 12/009 |
| 2023/0007473 | A1* | 1/2023 | Muthuchamy | H04W 12/72 |
| 2023/0033793 | A1* | 2/2023 | Kim | H04L 65/1073 |
| 2023/0044476 | A1* | 2/2023 | Lei | H04W 12/50 |
| 2023/0095930 | A1* | 3/2023 | Wu | H04W 12/106 |
| | | | | 370/329 |
| 2023/0101531 | A1* | 3/2023 | Low | H04W 72/1268 |
| | | | | 370/329 |
| 2023/0102552 | A1* | 3/2023 | Ali | H04W 28/0273 |
| | | | | 370/329 |
| 2023/0109276 | A1* | 4/2023 | Wu | H04W 76/19 |
| | | | | 370/329 |

FOREIGN PATENT DOCUMENTS

| | | | | |
|---|---|---|---|---|
| CN | 107580324 A | 1/2018 | | |
| WO | WO-2016012034 A1 * | 1/2016 | | H04L 65/1016 |
| WO | 2016209131 A1 | 12/2016 | | |
| WO | 2017091960 A1 | 6/2017 | | |
| WO | 2018006017 A1 | 1/2018 | | |
| WO | WO-2018140384 A1 * | 8/2018 | | H04W 8/20 |

OTHER PUBLICATIONS

Ravindran et al ("Ravindran," Realizing ICN in 3GPP's 5G NextGen Core Architecture, Nov. 7, 2017, pp. 1-7). (Year: 2017 ).*
Vosoughi et al "Fast Message Authentication Code for Mulitple Messages with Provable Security," pp. 1-5 (Year: 2010).*
Peters et al "Anticiipatory User Plane Management for 5G," IEEE Computer Society, pp. 9-15 (Year: 2018).*
Arnold et al "5G Radio Access Network Architecture Based on Flexible Functional Control/User Plane Splits," IEEE, pp. 1-5 (Year: 2017).*
Huawei et al.,"TS 23.501: AF influenced PDU session establishment and ON authentication/authorization via NEF",3GPP TSG SA WG2 Meeting #123 S2-177983,Oct. 23-Oct. 27, 2017 ~ Slovenia,Total 6 Pages.
Sami Kekki et al.,ETSI White Paper No. 28,"MEC in 5G networks",First edition—Jun. 2018,total 28 pages.
3GPP TR 33.899 V1.3.0 (Aug. 2017),3rd Generation Partnership Project;Technical Specification Group Services and System Aspects;Study on the security aspects of the next generation system(Release 14), total 605 pages.
S2-171061 Huawei, HiSilicon,"TS 23.501: Terminology and role of applications and Application Functions—alternative implementation",SA WG2 Meeting #119,Feb. 13, 2017, Dubrovnik, Croatia,total 5 pages.
S2-171203 Sandvine Inc.,"Discussion on UPF architecture and interconnection to PCF, SMF",SA WG2 Meeting #S2-119,Feb. 13, 2017, Dubrovnik, Croatia,total 14 pages.
3GPP TS 23.501 V2.0.1 (Dec. 1, 2017),3rd Generation Partnership Project;Technical Specification Group Services and System Aspects;System Architecture for the 5G System;Stage 2(Release 15),total 183 pages.

(56) References Cited

OTHER PUBLICATIONS

ETSI GS MEC 002 V1 1 1 (Mar. 1, 2016),Mobile Edge Computing (MEC);Technical Requirements,total 40 pages.

* cited by examiner

MESSAGE PROCESSING METHOD AND SYSTEM, AND USER PLANE FUNCTION DEVICE

CROSS-REFERENCE TO RELATED APPLICATIONS

This application is a continuation of International Application No. PCT/CN2019/076832, filed on Mar. 4, 2019, which claims priority to Chinese Patent Application No. 201810179465.6, filed on Mar. 5, 2018. The disclosures of the aforementioned applications are hereby incorporated by reference in their entireties.

TECHNICAL FIELD

This application relates to the field of wireless communications technologies, and in particular, to a message processing method and system and related user plane function device.

BACKGROUND

To promote the development of 5G-oriented network technologies and architectures, the concept of mobile edge computing (MEC) is currently being introduced. The MEC concept is to deploy applications, content, and some mobile broad band (MBB) service processing and resource scheduling functions of a core network near the network edge close to the access side, so that a service is processed at a point close to a user, and the applications, content, and networks can collaborate with each other, to provide reliable and ultimate service experience. In a specific application, as shown in FIG. 1, application (APP) modules that provide different functions may be deployed in a network that employs the MEC technology. An APP reports its supported functions to a mobile edge platform (MEP), and the MEP reports received information to a network exposure function (NEF).

In a specific implementation process, user equipment (UE) requests a network side to perform user information authentication when accessing a network. However, in an MEC switching scenario, the UE needs to request a central APP to perform user information authentication again. This increases network resource overheads. In addition, in an existing APP authentication process, an APP needs to request a remote APP to perform authentication, and there are a relatively large quantity of interaction procedures between the APP and the central APP, which takes a long time and cannot be used in a low-latency service.

Therefore, in the current 5G system, a UE authentication solution that can optimize the interaction procedure between an APP and a central APP, simplify a UE authentication process, and reduce latency and network resource overhead is urgently needed.

SUMMARY

In view of this, embodiments of this application provide a message processing method and system and related user plane function device, to solve a prior art problem that in an MEC switching scenario, network resource overhead and latency are increased due to a relatively large quantity of interaction procedures between an APP and a central APP in a UE authentication process.

The following technical solutions are provided in the embodiments of this application.

According to a first aspect, an embodiment of this application provides a message processing method, applied to a user plane function (UPF) device. The method includes:
receiving UE authentication information sent by an SMF device;
comparing a received uplink message of UE with the UE authentication information; and
if the received uplink message of the UE matches the UE authentication information, i.e., there is a match, sending, by the UPF device, the uplink message that includes the UE authentication information to a first APP, where the first APP performs authentication on the UE according to the UE authentication information.

According to the foregoing solution, the UE authentication information sent by the SMF device is received; the received uplink message of the UE is compared with the UE authentication information, and if there is a match, the uplink message that includes the UE authentication information is sent to the first APP; and authentication is performed by the first APP on the UE according to the UE authentication information. In the foregoing process, authentication on the UE does not need to be performed by a remote APP. This simplifies the authentication process, reduces network resource overheads, implements fast UE authentication, reduces the latency of UE authentication, and further increases the APP switching speed.

In a possible design, the UE authentication information includes an MSISDN parameter, and the UE authentication information is obtained by the SMF from an authentication center; or
the UE authentication information includes a token parameter and a session ID, and the UE authentication information is obtained by the SMF from a second APP.

In a possible design, the UE authentication information includes at least an MSISDN parameter, or both a token parameter and a session ID, and the UE authentication information is configured by an operation support system (OSS) and is obtained by the SMF from the OSS.

In a possible design, the UE authentication information includes the MSISDN parameter, and the comparing, by the UPF device, an uplink message with the UE authentication information includes:
comparing, by the UPF device, uniform resource locator (URL) information in the uplink message with the UE authentication information, and if corresponding flow information is found through comparing, determining that there is a match.

In a possible design, the sending, by the UPF device, the uplink message that includes the UE authentication information to a first APP includes:
sending, by the UPF device, the uplink message that includes the MSISDN parameter to a mobile edge platform (MEP), and forwarding, by the MEP, the MSISDN parameter to the first APP, where the uplink message includes the MSISDN parameter in an hypertext transfer protocol (HTTP) header enrichment manner.

In a possible design, the UE authentication information includes a token parameter and a session ID, and the comparing, by the UPF device, an uplink message with the UE authentication information includes:
comparing, by the UPF device, profile identifier information in the uplink message with the UE authentication information, and if corresponding flow information is found through comparing, determining that there is a match.

In a possible design, the sending, by the UPF device, the uplink message that includes the UE authentication information to a first application APP includes:

sending, by the UPF device, the uplink message that includes the token parameter and the session ID to a mobile edge platform (MEP), and forwarding, by the MEP to the first APP, the token parameter and the session ID that are obtained by parsing a tunnel header, where the uplink message includes the token parameter and the session ID in a tunnel header enrichment manner of MEC.

In a possible design, the sending, by the UPF device, the uplink message that includes the UE authentication information to a first APP includes:

sending, by the UPF device, the uplink message that includes the UE authentication information to a mobile edge platform (MEP), and forwarding, by the MEP, the UE authentication information to the first APP, where the uplink message includes the UE authentication information in an IP header extension field manner.

In a possible design, the performing authentication, by the first application APP, on the UE according to the UE authentication information includes:

calculating, by the first APP by using a hash algorithm, a network signature of the UE authentication information and a network signature of authentication information prestored on a network side, and comparing the two network signatures, and if there is a match, determining that the authentication succeeds; or comparing, by the first APP, the UE authentication information with authentication information prestored on a network side, and if the UE authentication information matches the authentication information prestored on a network side, determining that the authentication succeeds; or requesting, by the first APP, a central APP to perform authentication on the UE according to the UE authentication information.

According to a second aspect, an embodiment of this application provides a user plane function (UPF) device. The UPF device establishes a connection to a session management function (SMF). The user plane function UPF includes:

a communications interface, configured to receive an uplink message of user equipment (UE) and UE authentication information that are sent by the SMF, and send the uplink message and the UE authentication information to a processor; and the processor, configured to compare the uplink message received from the communications interface with the UE authentication information, and if there is a match, send the uplink message that includes the UE authentication information to a first APP, where the first APP performs authentication on the UE according to the UE authentication information.

In a possible design, the communications interface is configured to obtain UE authentication information obtained by the SMF from an authentication center, where the UE authentication information includes an MSISDN parameter; or the communications interface is configured to obtain UE authentication information obtained by the SMF from a second APP, where the UE authentication information includes a token parameter and a session ID; or the communications interface is configured to obtain UE authentication information that is obtained by the SMF from an OSS, where the UE authentication information includes at least an MSISDN parameter, or both a token parameter and a session ID.

In a possible design, if the UE authentication information includes the MSISDN parameter, the processor is configured to compare URL information in the uplink message with the UE authentication information; if corresponding flow information is found through comparing, it is determined that the URL information in the uplink message matches with the UE authentication information; the uplink message that includes the MSISDN parameter is sent to a mobile edge platform (MEP) through the communications interface, and the MEP forwards the MSISDN parameter to the first application APP, where the uplink message includes the MSISDN parameter in an HTTP header enrichment manner.

In a possible design, if the user equipment UE authentication information includes at least the token message and the session ID, the processor is configured to compare profile identifier information in the uplink message with the UE authentication information; if corresponding flow information is found through comparing, it is determined that the profile identifier information matches the UE authentication information; the uplink message that includes the token parameter and the session ID is sent to an MEP through the communications interface, and the MEP forwards the token parameter and the session ID that are obtained by parsing a tunnel header to the first APP, where the uplink message includes the token parameter and the session ID in a tunnel header enrichment manner of MEC.

In a possible design, the communications interface is further configured to send the uplink message that includes the UE authentication information to a mobile edge platform (MEP), and the MEP forwards the UE authentication information to a first APP, where the uplink message includes the UE authentication information in an IP header extension field manner.

According to a third aspect, an embodiment of this application provides a message processing system. The system includes:

a session management function (SMF), configured to: after determining to access an uplink classifier, send obtained user equipment UE authentication information to a user plane function (UPF) device to which the SMF is connected, where the UPF device is the user plane function UPF device according to the embodiments described above;

a UPF device, configured to compare a received uplink message with the UE authentication information, and if there is a match, send the uplink message that includes the UE authentication information to a first APP; and the first APP, configured to perform authentication on the UE according to the UE authentication information.

In a possible design, the first APP is configured to calculate, by using a hash algorithm, a network signature of the UE authentication information and a network signature of authentication information prestored on a network side, and compares the two network signatures, and if they are the same, the first APP determines that the authentication succeeds; or compare the UE authentication information with authentication information prestored on a network side, and if there is a match, determine that the authentication succeeds; or request a central APP to perform authentication on the UE according to the UE authentication information.

According to a fourth aspect, an embodiment of this application provides a computer readable storage medium, transitory or non-transitory, including an instruction. When the instruction is run on a computer, the computer is enabled to perform the message processing method disclosed in the first aspect of the embodiments of this application.

According to a fifth aspect, an embodiment of this application provides a computer program product including an instruction. When the instruction is run on a computer, the computer is enabled to perform the message processing methods according to each of the foregoing aspects.

Embodiments of this application disclose a message processing method and system, and related user plane function device. A session management function (SMF) sends obtained UE authentication information to a user plane function (UPF) device to which the SMF establishes a connection. The UPF device matches a received uplink message of the UE with the UE authentication information. When the matching succeeds, the UPF device sends the uplink message that includes the UE authentication information to a first APP. The first local APP performs authentication on the UE according to the UE authentication information. In the foregoing process, authentication on the UE does not need to be performed by a remote APP. This simplifies the authentication process, reduces network resource overhead, implements a faster authentication process on the UE, reduces latency of UE authentication, and further increases an APP switching speed.

DESCRIPTION OF EMBODIMENTS

Figure 1:
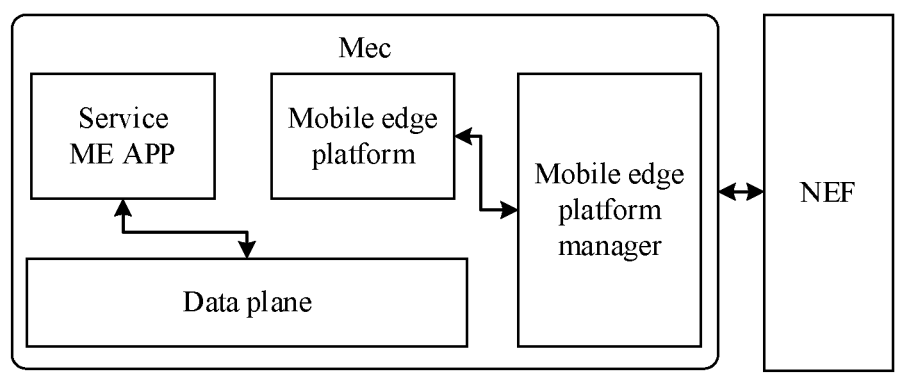
FIG. 1 is a schematic diagram of reporting information to an NEF by an APP module in MEC disclosed in the prior art.

Embodiments of this application disclose a message processing method and system, and a related UPF device, to simplify a UE authentication procedure and reduce network resource overhead and latency in an MEC switching scenario of applications.

The following describes the technical solutions in the embodiments of this application with reference to the accompanying drawings in the embodiments of this application. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, in the descriptions of this application, "a plurality of" means two or more than two. In addition, to clearly describe the technical solutions in the embodiments of this application, terms such as "first" and "second" are used in the embodiments of this application to distinguish between same items or similar items that have basically same functions and purposes. A person skilled in the art may understand that the terms such as "first" and "second" do not limit a quantity or an execution sequence, and the terms such as "first" and "second" do not indicate a definite difference.

In addition, the terms "include" and "have" in the embodiments, claims, and accompanying drawings of this application are not exclusive. For example, a process, method, system, product, or device including a series of steps or modules is not limited to the enumerated steps or modules, and may further include a step or module that is not enumerated.

An objective of MEC is to deploy applications, content, and some MBB service processing and resource scheduling functions of a core network on the network edge close to an access side, so that a service is processed close to a user, and applications, content, and networks collaborate with each other, to provide reliable and ultimate service experience. The MEC technology improves network performance by deploying optimized network functions near the edge close to users. For example, if core network functions are deployed close to users, ultra-low latency experience can be implemented. For example, an end-to-end latency of 1 ms is proposed based on the MEC technology to support services such as autonomous driving. Internet content is cached nearby based on an MEC platform, and this saves a large number of transmission resources. The MEC technology provides an open platform to implement cross-industry cooperation and flexible service innovation.

It can be learned from the background that APP modules that provide different functions may be deployed on the MEC platform. An APP reports its supported functions to an MEP, and the MEP reports received information to an NEF. In a specific implementation process, UE has requested a network side to perform user information authentication when accessing a network. However, in an MEC switching scenario of an APP, the UE needs to request a central APP to perform user information authentication again. Therefore, there are a relatively large quantity of interaction procedures between the APP and the central APP in the authentication process, which increases network resource overheads and latency. To resolve the problem, the embodiments of this application disclose a UE authentication solution that can optimize an interaction procedure between an APP and a central APP, simplify a UE authentication process, and reduce latency and network resource overhead.

Figure 2:
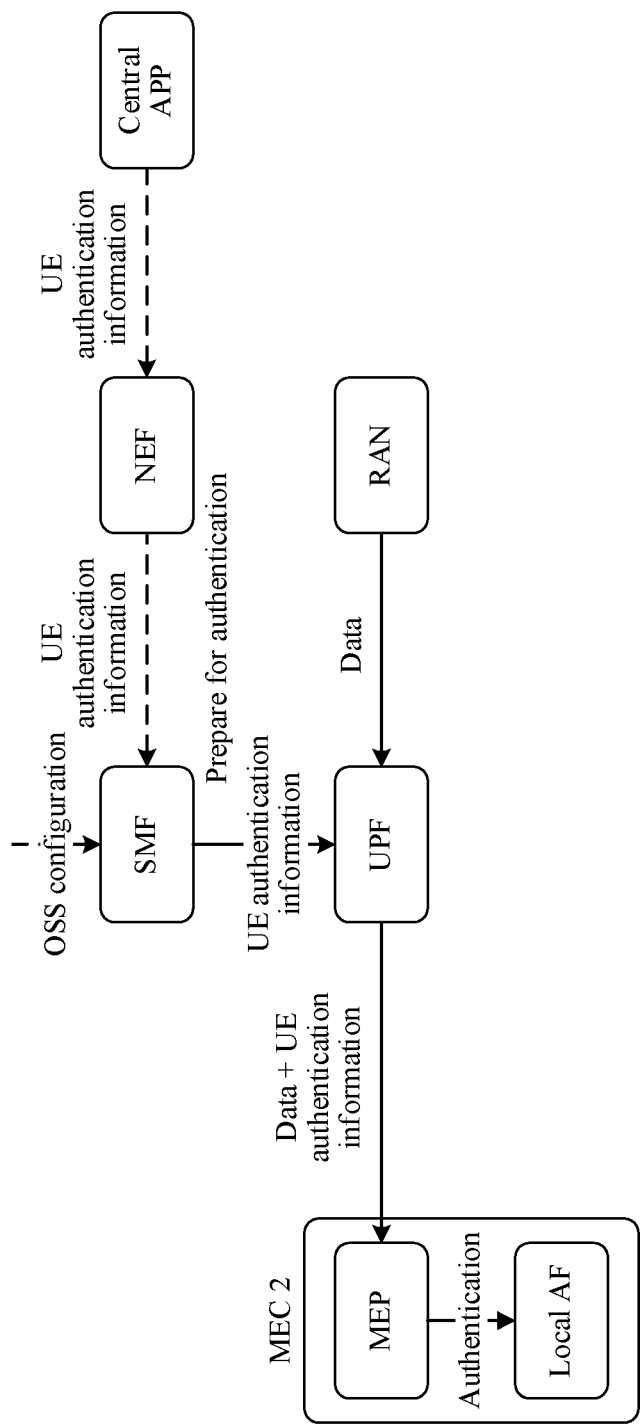
FIG. 2 is a schematic diagram of a network architecture according to an embodiment of this application.

FIG. 2 is a diagram of a network architecture of a message processing method according to an embodiment of this application. The diagram shows a central application function (AF), an NEF, an SMF, a RAN, a UPF, and an MEC 2. The MEC 2 includes an MEP and a local APP.

The central AF may be considered as a central APP far away from the user edge, or may be considered as an authentication center far away from the user edge.

In a specific implementation, the UPF may be a UPF entity or a UPF device.

Based on the network architecture, after the UE accesses the RAN, the central AF sends UE authentication information to the NEF, and then the NEF sends the UE authentication information to the SMF. Alternatively, an operation support system (OSS) configures the UE authentication information, and then sends the UE authentication information to the SMF.

After determining to access an uplink classifier (ULCL), the SMF sends the received UE authentication information to the UPF. After the UE is switched from an MEC 1 platform to an MEC 2 platform, the APP needs to perform re-authentication on the UE. The RAN sends an uplink message of the UE to the UPF, and the UPF tries to match the received uplink message with the UE authentication information by comparing the two. If the matching succeeds, the UPF sends the UE authentication information to the MEC, and the local APP in the MEC performs UE authentication based on the UE authentication information. After the authentication is complete, the local APP sends an authentication result to the MEP. If the UE is successfully authenticated, a downlink message is sent to the UE.

Figure 3:
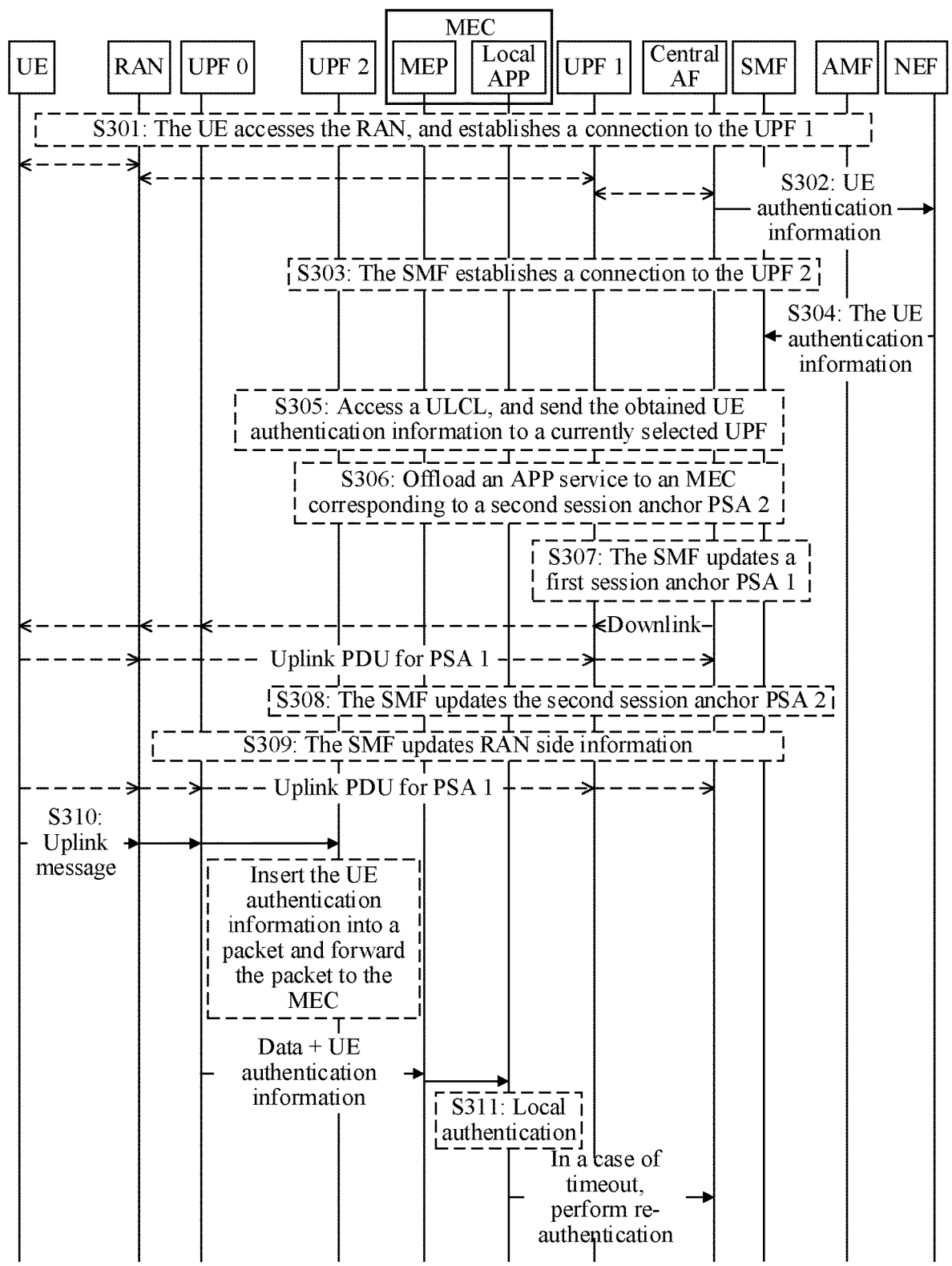
FIG. 3 is a schematic flowchart of a message processing method according to an embodiment of this application.

As shown in FIG. 3, with reference to the foregoing architecture, an embodiment of this application discloses a specific execution process of a message processing method. The method mainly includes the following steps.

S301: The UE accesses the RAN, and establishes a connection to a UPF 1.

In a specific implementation, that the UE establishes a connection to the UPF 1 means that the UE establishes for a protocol data unit (PDU) session a session anchor, that is, a first session anchor (PDN session anchor, PSA 1).

S302: A central AF sends the UE authentication information to the NEF.

A dashed line between S301 and S302 in the figure refers to a flow direction of information of the UE. Specifically, the UE accesses the RAN, the RAN sends the UE authentication information to the central AF through the UPF 1, the central AF performs authentication on the UE, and feeds back an authentication result to the UE through the UPF 1. In addition, the UE authentication acknowledgement information is obtained after the authentication succeeds.

Currently, the central AF supports two authentication modes: APP authentication and network authentication.

The APP itself may perform authentication on the UE, or the APP may perform authentication on the UE by using authorization authentication information provided by the MEP. During APP authentication, the UE authentication information includes a token parameter and a session ID.

Network authentication is to insert an MSISDN parameter or a token allocated to a network into the authentication information, to complete authentication on the UE.

In a specific implementation, the central AF may be the central AF shown in FIG. 2. In other words, the central AF may be an authentication center, and the UE authentication information sent by the authentication center to the NEF includes at least the MSISDN parameter. The central AF may also be a second APP. The second APP is a central APP, and may be considered as a remote APP relative to the UE. The UE authentication information sent by the central APP to the NEF includes at least the token parameter and the session ID.

Optionally, the UE authentication information may be configured by an OSS, and then sent to the SMF. The UE authentication information includes at least the MSISDN parameter, or both the token parameter and the session ID.

S303: The SMF establishes a connection to a UPF 2.

In a specific implementation, that the SMF establishes the connection to the UPF 2 means that a PSA is established for the PDU. Because the UE moves, the SMF needs to establish a new PDU session anchor. In other words, a second session anchor PSA 2 is established for a PDU session.

In this embodiment of this application, the UPF 2 that establishes the connection to the SMF is the same as the UPF shown in FIG. 2.

S304: The NEF forwards the UE authentication information to the SMF.

In a specific implementation, the NEF forwards the prestored authentication information of the UE that is sent by the central AF to the SMF. The central AF does not need to perform an authentication procedure again, and therefore the central AF does not need to perform authentication on the UE and does not need to send the determined UE authentication information to the SMF.

S305: The SMF sends the obtained UE authentication information to a currently selected UPF 0.

In a specific implementation, when the UE moves or the UE initiates a new service, the SMF determines to access the ULCL, selects a new UPF 0, and enables a current service to access to an edge APP. Specifically, the SMF establishes a connection to the UPF 0, where the UPF 0 may act as a ULCL device and perform uplink offloading. When the UE moves or the UE initiates a new service, the SMF selects a new UPF, and enables the current service to access the edge APP.

In a specific implementation, to accommodate the movement of the UE, the selected UPF 0 enables the current service to access an edge APP close to the UE. For different services of one UE, the new APP service is offloaded to an edge APP close to the UE.

S306: The SMF performs MEC switching by using the UPF 0 to offload an APP service to an MEC corresponding to the second session anchor PSA 2.

S307: The SMF updates the first session anchor PSA 1, and sends downlink data to the UE by using the first session anchor PSA 1 based on an offloading function of the UPF 0.

In a specific implementation, the SMF notifies the UPF 1 of the PSA 1.

After the SMF updates the first session anchor PSA 1, the central AF sends, by using the PSA 1 and the UPF 0, the downlink message to the UE that accesses the RAN. The UE sends an uplink message to the central AF by using the PSA 1.

S308: The SMF updates the second session anchor PSA 2.

In a specific implementation, the SMF notifies the UPF 2 of the PSA 2.

S309: The SMF updates RAN side information.

In a specific implementation, the SMF notifies the RAN of an address of the UPF 0, to offload subsequent information flows by using the UPF 0.

S310: The RAN sends an uplink message of the UE to the UPF 2.

In a specific implementation, the RAN sends the uplink message of the UE to the central AF by using the UPF 0 and the PSA 1.

S311: The UPF 2 matches the received UE authentication information with the uplink message, and if the matching succeeds, the UPF 2 sends the uplink message that includes the UE authentication information to the first APP.

In a specific implementation, the first APP is an APP in the MEC close to the UE, that is, a local APP. The UPF 0 sends, to the MEC, a packet into which the UPF 0 inserts the UE authentication information, and the MEP in the MEC forwards the packet to the local app.

S312: The first APP performs authentication on the UE according to the UE authentication information, and if the authentication succeeds, the first APP sends a downlink message to the UE.

It should be noted that if the authentication fails, for example, due to time-out, the UE requests the central AF to perform re-authentication.

In a specific implementation, optionally, the first APP calculates, by using a hash algorithm, a network signature of the UE authentication information and a network signature of authentication information prestored on a network side, and compares the two network signatures, and if they match, the first APP determines that the authentication succeeds.

Optionally, the first APP tries to match the UE authentication information with authentication information prestored on a network side, and if the matching succeeds, the first APP determines that the authentication succeeds.

Optionally, the first APP requests the central APP to perform authentication on the UE according to the UE authentication information.

It should be further noted that, in a specific implementation, the UPF 0, the UPF 1, and the UPF 2 in this embodiment of this application may be UPF entities or UPF devices.

In this embodiment of this application, in an MEC switching scenario, the SMF sends the obtained UE authentication information to the UPF 2. After determining that the received uplink message of the UE matches the UE authentication information, the UPF 2 sends the uplink message that includes the UE authentication information to the local APP. The local APP performs authentication on the UE, so the authentication does not need to be performed by the remote APP. This simplifies the authentication process, reduces network resource overhead, implements fast authentication on the UE, and reduces a latency of UE authentication. Further, this increases the switching speed of the APP.

Figure 4:
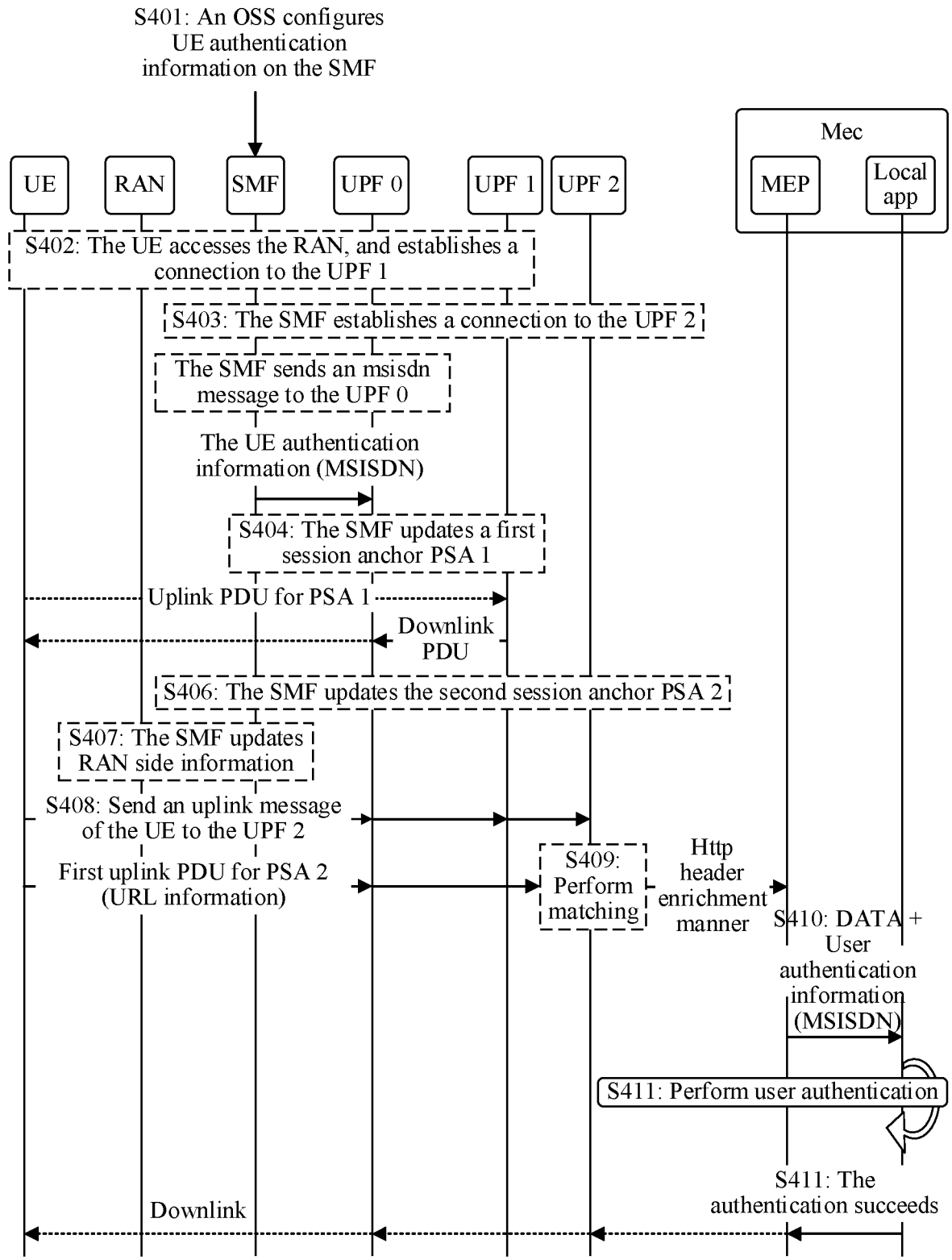
FIG. 4 is a schematic flowchart of another message processing method according to an embodiment of this application.

According to the message processing process disclosed in this embodiment of this application, content included in the UE authentication information varies with the source of the UE authentication information received by the SMF. If the UE authentication information is configured on the SMF by the OSS, the UE authentication information includes at least the MSISDN parameter. In a specific implementation, an embodiment of this application discloses another message processing method. As shown in FIG. 4, the method mainly includes the following steps.

S401: An OSS configures UE authentication information on an SMF.

S402: UE accesses a RAN, and establishes a connection to a UPF 1.

For a specific access manner, refer to the description about access of the UE to the RAN in the description corresponding to FIG. 3, and details are not described herein again.

S403: An SMF establishes a connection to a UPF 2.

For a specific access manner, refer to the description of establishing a connection by the SMF to the UPF 2 in the description corresponding to FIG. 3. Details are not described herein again.

S404: The SMF accesses the ULCL, and sends an MSISDN parameter in the obtained UE authentication information to a currently selected UPF 0.

For a specific execution manner, refer to the description of sending the UE authentication information by the SMF to the selected UPF 0 in the description corresponding to FIG. 3. Details are not described herein again.

S405: The SMF updates the first session anchor PSA 1, and sends downlink data to the UE by using the UPF 1 based on an offloading function of the UPF 0.

In a specific implementation, the SMF notifies the UPF 1 of the PSA 1.

S406: The SMF updates the second session anchor PSA 2.

In a specific implementation, the SMF notifies the UPF 2 of the PSA 2.

S407: The SMF updates RAN side information.

In a specific implementation, the SMF notifies the RAN of an address of the UPF 0, to offload subsequent information flows by using the UPF 0.

S408: The RAN sends an uplink message of the UE to the UPF 2.

In a specific implementation, the RAN sends an uplink message to the UPF 2 by using the UPF 0 and the PSA 1.

S409: The UPF 2 matches the UE authentication information with the uniform resource locator (URL) information in the uplink message, and if corresponding flow information is found through matching, the UPF 2 determines that the matching succeeds, and sends the uplink message that includes the MSISDN parameter to the MEP.

In a specific implementation, optionally, the uplink message may carry the MSISDN parameter in an HTTP header enrichment manner. Optionally, the uplink message may also carry the MSISDN parameter in an IP header extension field manner.

S410: The MEP obtains the MSISDN parameter in the uplink message, and sends the MSISDN parameter to the local APP.

S411: The local APP performs authentication on the UE according to the MSISDN parameter, and if the authentication succeeds, the local APP sends a downlink message to the UE.

In this embodiment of this application, in an MEC switching scenario, the SMF sends the obtained UE authentication information to the UPF 2. After the UPF 2 matches the received uplink message of the UE with the UE authentication information, and determines that the matching succeeds, the UPF 2 sends the uplink message that includes the UE authentication information to the local APP. The local APP performs authentication on the UE, so the authentication does not need to be performed by the remote APP. This simplifies the authentication process, reduces network resource overheads, implements fast authentication on the UE, and reduces the latency of UE authentication. Further, this increases a switching speed of the APP.

Figure 5:
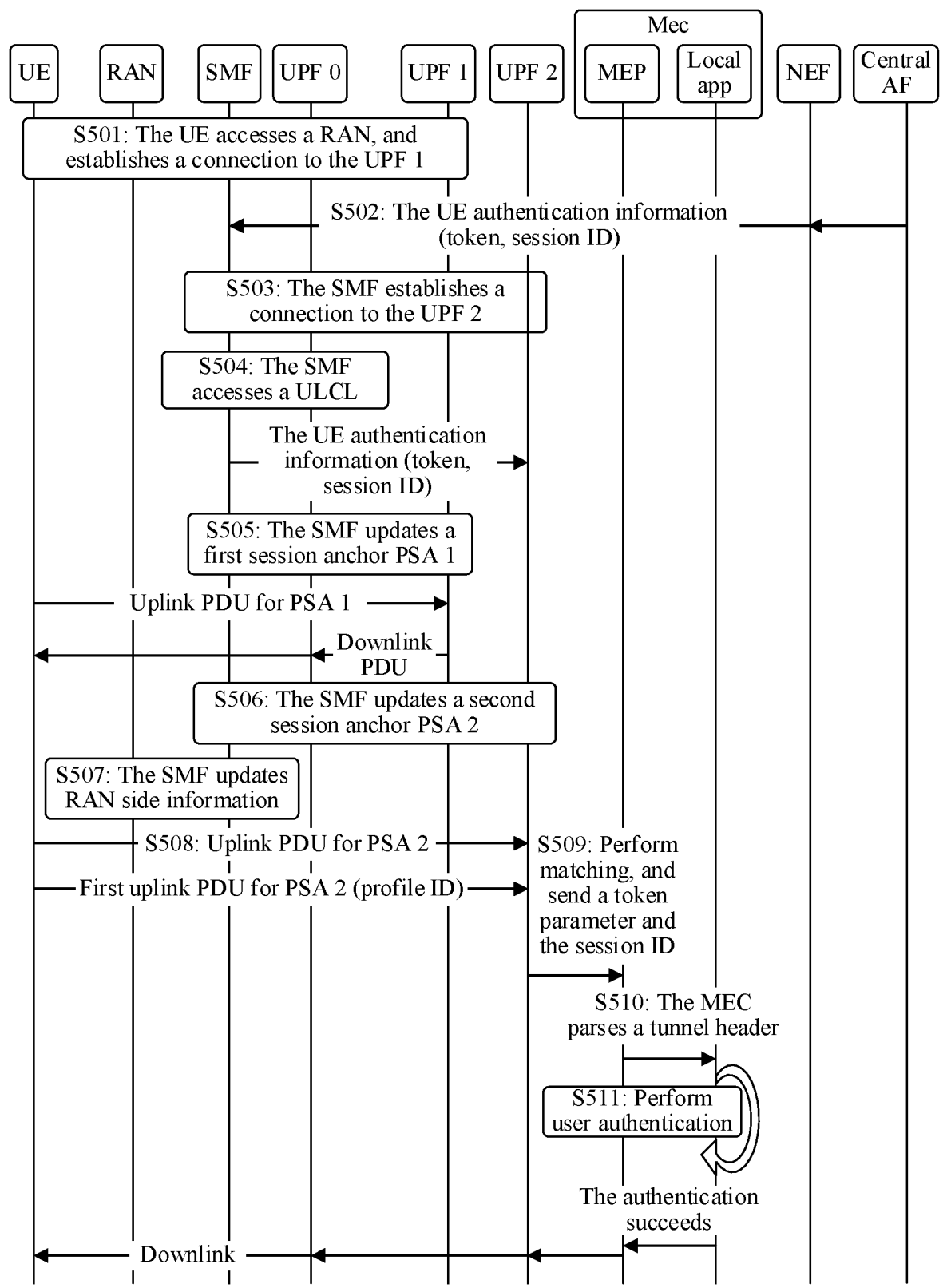
FIG. 5 is a schematic flowchart of another message processing method according to an embodiment of this application.

If the UE authentication information is sent by the central AF to the SMF, the UE authentication information includes at least the token parameter and the session ID. In a specific implementation, an embodiment of this application discloses another message processing method. As shown in FIG. 5, the method mainly includes the following steps.

S501: UE accesses a RAN, and establishes a connection to a UPF 1.

For a specific access manner, refer to the description about access of the UE to the RAN in the description corresponding to FIG. 3, and details are not described herein again.

S502: The central AF sends, to an SMF, a token parameter and a session ID that are included in the authentication information of the UE that accesses a RAN.

S503: An SMF establishes a connection to a UPF 2.

For a specific access manner, refer to the description of establishing a connection by the SMF to the UPF 2 in the description corresponding to FIG. 3. Details are not described herein again.

S504: The SMF accesses the ULCL, and sends the token parameter and the session ID that are in the obtained UE authentication information to a currently selected UPF 0.

For a specific execution manner, refer to the description of sending the UE authentication information by the SMF to the selected UPF 0 in the description corresponding to FIG. 3. Details are not described herein again.

S505: The SMF updates the first session anchor PSA 1, and sends downlink data to the UE by using the UPF 1 based on an offloading function of the UPF 0.

In a specific implementation, the SMF notifies the UPF 1 of the PSA 1.

S506: The SMF updates the second session anchor PSA 2.

In a specific implementation, the SMF notifies the UPF 2 of the PSA 2.

S507: The SMF updates RAN side information.

In a specific implementation, the SMF notifies the RAN of an address of the UPF 0, to offload subsequent information flows by using the UPF 0.

S508: The RAN sends an uplink message of the UE to the UPF 2.

In a specific implementation, the RAN sends an uplink message to the UPF 2 by using the UPF 0 and the PSA 1.

S509: The UPF 2 matches profile identifier information in the uplink message with the UE authentication information, and if corresponding flow information is found through matching, the UPF 2 determines that the matching succeeds, and sends the token parameter and the session ID to the MEP by using the uplink message.

In a specific implementation, optionally, the uplink message may carry the token parameter and the session ID in a tunnel header enrichment manner of the MEC. Optionally, the uplink message may carry the token parameter and the session ID in an IP header extension field manner.

S510: The MEP parses the tunnel header, and forwards the obtained token parameter and session ID to the local APP.

S511: The local APP performs authentication on the UE according to the token parameter and the session ID, and if the authentication succeeds, the local APP sends a downlink message to the UE.

According to the message processing methods disclosed in FIG. 4 and FIG. 5, the local APP performs authentication on the UE according to the UE authentication information in a plurality of manners.

Optionally, the local APP may calculate, by using a hash algorithm, a network signature of the UE authentication information and a network signature of authentication information prestored on a network side, and compares the two network signatures, and if they match, the local APP determines that the authentication succeeds.

Optionally, the local APP matches the UE authentication information with authentication information prestored on a network side, and if the matching succeeds, the local APP determines that the authentication succeeds.

Optionally, the local APP may request the central APP to perform authentication on the UE according to the UE authentication information. If the authentication fails, APP authentication is performed again.

In this embodiment of this application, in an MEC switching scenario, the SMF sends the obtained UE authentication information to the UPF 2. After the UPF 2 matches the received uplink message of the UE with the UE authentication information, and determines that the matching succeeds, the UPF 2 sends the uplink message that includes the UE authentication information to the local APP. The local APP performs authentication on the UE, so the authentication does not need to be performed by the remote APP. This simplifies the authentication process, reduces network resource overheads, implements fast authentication on the UE, and reduces the latency of UE authentication. Further, this increases a switching speed of the APP.

With reference to the message processing methods disclosed in the foregoing embodiments of this application, an embodiment of this application further discloses a system for performing the methods for user equipment authentication. In a specific implementation, the network architecture shown in FIG. 2 may be used.

Figure 6:
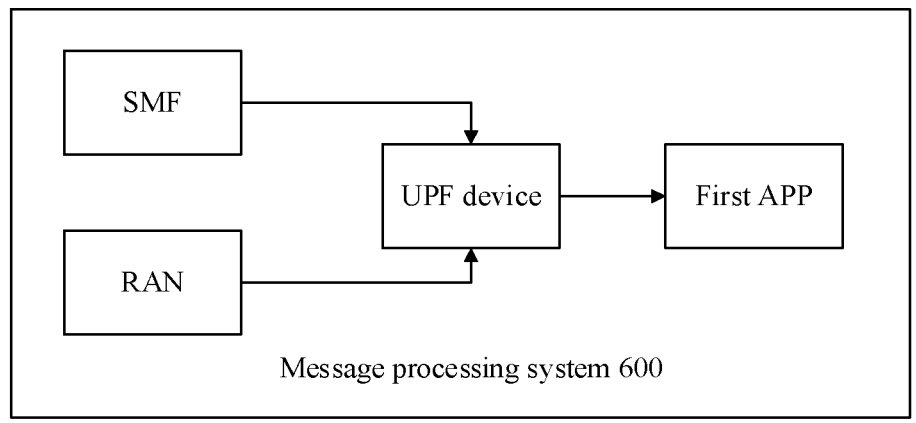
FIG. 6 is a schematic structural diagram of a UPF device according to an embodiment of this application.

As shown in FIG. 6, a message processing system 600 includes an SMF, a RAN, a UPF device, and a first APP.

The SMF is configured to select a new UPF after determining to access the ULCL, and send obtained UE authentication information to a UPF device to which the SMF establishes a connection. A second PSA is established between the SMF and the UPF device. The UE authentication information is authentication information of UE that establishes a connection to a first PSA when the UE accesses the RAN.

In a specific implementation, optionally, the SMF obtains the UE authentication information from the authentication center, and forwards the UE authentication information using the NEF.

Optionally, the SMF obtains the UE authentication information from a second APP, and forwards the UE authentication information using the NEF.

Optionally, the SMF is configured to obtain UE authentication information configured by an OSS. The UE authentication information includes at least the MSISDN parameter, or both the token parameter and the session ID.

The RAN is configured to send an uplink message of the UE to the UPF device.

The UPF device is configured to match the received uplink message with the UE authentication information, and if the matching succeeds, the UPF device sends the uplink message that includes the UE authentication information to the first APP.

In a specific implementation, if the UE authentication information includes at least the MSISDN parameter, the UPF device is configured to compare the URL information in the uplink message with the UE authentication information, and if corresponding flow information is found through comparison, the UPF device determines that the URL information in the uplink message matches the UE authentication information, and sends the MSISDN parameter to the MEP by using the uplink message, and the MEP forwards the MSISDN parameter to the first APP. The uplink message includes the MSISDN parameter in an HTTP header enrichment manner.

In a specific implementation, if the UE authentication information includes at least the token parameter and the session ID, the UPF device is configured to compare the profile ID information in the uplink message with the UE authentication information, and if corresponding flow information is found through comparison, the UPF device determines that the profile ID information matches the UE authentication information, and sends the token message and the session ID to the MEP by using an uplink message. The MEP forwards the token parameter and session ID obtained by parsing a tunnel header to a local APP. The uplink message includes the token parameter and the session ID in a tunnel header enrichment manner of MEC.

In a specific implementation, the uplink message may also carry the UE authentication information in an IP header extension field manner. The UPF sends the UE authentication information to the MEP by using piggyback data, and the MEP forwards the UE authentication information to the first APP.

The first APP is configured to perform authentication on the UE according to the UE authentication information.

In a specific implementation, optionally, the first APP calculates, by using a hash algorithm, a network signature of the UE authentication information and a network signature of authentication information prestored on a network side, and compares the two signatures, and if the two signatures match, the first APP determines that the authentication succeeds.

Optionally, the first APP is configured to match the UE authentication information with authentication information prestored on a network side, and if the matching succeeds, the first APP determines that the authentication succeeds.

Optionally, the first APP is configured to request the central APP to perform authentication on the UE according to the UE authentication information.

For corresponding operations of execution bodies in the message processing system 600 disclosed in this embodiment of this application, reference may be made to specific descriptions of the corresponding execution bodies in the message processing method in the foregoing embodiments of this application. Details are not described herein again.

According to the message processing methods and the message processing system disclosed in the embodiments of this application, the UPF device that establishes a connection to the SMF disclosed in the embodiments of this application may be directly implemented by using hardware, a memory executed by a processor, or a combination thereof.

Figure 7:
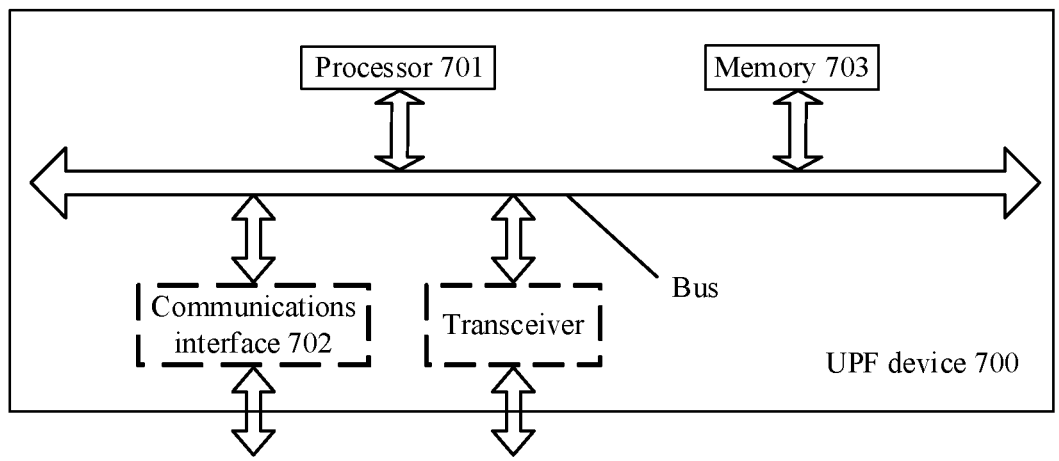
FIG. 7 is a schematic structural diagram of a user equipment authentication system according to an embodiment of this application.

As shown in FIG. 7, the UPF device 700 includes a processor 701 and a communications interface 702. Optionally, the UPF device 700 further includes a memory 703.

The processor 701 is connected to the memory 703 via a bus. The processor 701 is connected to the network interface 702 via a bus.

The processor 701 may be a central processing unit (CPU), a network processor (NP), an application-specific integrated circuit (ASIC), or a programmable logic device (PLD). The PLD may be a complex programmable logic device (CPLD), a field-programmable gate array (FPGA), or a generic array logic (GAL).

The memory 703 may be specifically a content-addressable memory (CAM) or a random access memory (RAM). The CAM may be a ternary content addressable memory (TCAM).

Alternatively, the memory 703 may be integrated into the processor 701. If the memory 703 and the processor 701 are mutually independent devices, the memory 703 is connected to the processor 701. For example, the memory 703 and the processor 701 may communicate with each other by using a bus. Communication between the communications interface 702 and the processor 701 may be performed by using a bus. Alternatively, the communications interface 702 may be directly connected to the processor 701.

The communications interface 702 may be a wired interface, for example, a fiber distributed data interface (FDDI) or an ethernet interface.

The memory 703 is configured to store an operation program, code, or an instruction related to the UPF 2 in the message processing method disclosed in the foregoing embodiments of this application. Optionally, the memory 703 includes an operating system and an application program.

When the processor 701 or a hardware device needs to perform an operation related to the UPF 2 disclosed in the embodiments of this application, the processor 701 or the hardware device may invoke and execute the operation program, the code, or the instruction stored in the memory 703, to complete a process in which the UPF 2 in the embodiments of this application performs a corresponding message processing method. For a specific process, reference may be made to the foregoing corresponding part of the embodiments of this application. Details are not described herein again.

The communications interface 702 is configured to perform an operation such as receiving/sending in a process in which the UPF device performs the message processing method.

In addition, operations such as receiving/sending in the message processing methods performed by the UPF device shown in FIG. 2 and FIG. 6, and the UPF device shown in FIG. 3 to FIG. 5 may refer to receiving/sending processing implemented by a processor, or may refer to a sending/receiving process completed by using a receiver and a transmitter. The receiver and the transmitter may exist independently, or may be integrated as a transceiver. In a possible implementation, the UPF device 700 may further include a transceiver.

It may be understood that FIG. 7 merely shows a simplified design of the UPF device. In an actual application, the UPF device may include any quantity of communications interfaces, processors, memories, and the like, and all UPF devices that can implement the embodiments of this application fall within a protection scope of the embodiments of this application.

In conclusion, the embodiments of this application disclose a message processing method and system, and a UPF device. The SMF sends the obtained UE authentication information to the UPF 2. After determining that the received uplink message of the UE matches the UE authentication information, the UPF 2 sends the uplink message that includes the UE authentication information to the local APP. The local APP performs authentication on the UE, so the authentication does not need to be performed by the remote APP. This simplifies the authentication process, reduces network resource overheads, implements fast authentication on the UE, and reduces the latency of UE authentication. Further, this increases a switching speed of the APP.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

Finally, it should be noted that the foregoing embodiments are merely intended for exemplarily describing the technical solutions of this application other than limiting this application. Although this application and benefits of this application are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of this application.

What is claimed is:

1. A message processing method, applied to a user plane function (UPF) device, wherein the method comprises:
   receiving user equipment (UE) authentication information sent by a session management function (SMF);
   comparing a received uplink message of UE with the UE authentication information; and
   if the received uplink message of the UE matches the UE authentication information, sending, by the UPF device, the uplink message that comprises the UE authentication information to a first application (APP), wherein the first APP performs authentication on the UE according to the UE authentication information;
   wherein the UE authentication information comprises a token parameter and a session identifier (ID), and the comparing, by the UPF device, of the received uplink message with the UE authentication information comprises;
      comparing, by the UPF device, profile identifier (profile ID) information in the uplink message with the UE authentication information, and if corresponding flow information is found through comparing, determining that the uplink message matches the UE authentication information;
   wherein the sending, by the UPF device, the uplink message that comprises the UE authentication information to a first APP comprises:
   sending, by the UPF device, the uplink message that comprises the token parameter and the session ID to a mobile edge platform (MEP), and forwarding, by the MEP to the first APP, the token parameter and the session ID that are obtained by parsing a tunnel header, wherein the uplink message comprises the token parameter and the session ID in a tunnel header enrichment manner of mobile edge computing (MEC).

2. The method according to claim 1, wherein
   the UE authentication information comprises a Mobile Station International Subscriber Directory Number (MSISDN) parameter, and the UE authentication information is obtained by the SMF from an authentication center; or
   the UE authentication information is obtained by the SMF from a second APP.

3. The method according to claim 1, wherein
   the UE authentication information comprises at least an MSISDN parameter and the UE authentication information is configured by an operation support system (OSS) and is obtained by the SMF from the OSS.

4. The method according to claim 1, wherein the performing authentication, by the first APP on the UE according to the UE authentication information comprises:
   calculating, by the first APP by using a hash algorithm, a network signature of the UE authentication information and a network signature of authentication information prestored on a network side, and comparing the network signature of the UE authentication information and the network signature of the authentication information prestored on the network side, and if the two network signatures match, determining that the authentication succeeds; or
   comparing, by the first APP, the UE authentication information with authentication information prestored on a network side, and if the UE authentication information matches the authentication information prestored on the network side, determining that the authentication succeeds; or
   requesting, by the first APP, a central APP to perform authentication on the UE according to the UE authentication information.

5. A user plane function (UPF) device, wherein the UPF device establishes a connection to a session management function (SMF), and the UPF device comprises:
   a memory configured to store computer program instructions;
   a communications interface circuit, configured to receive user equipment (UE) authentication information sent by the SMF and
   a processor, when executing the computer program instructions, configured to compare a received uplink message of the UE with the UE authentication information, and
   if the received uplink message of the UE matches the UE authentication information, send the uplink message that comprises the UE authentication information to a first application (APP), wherein the first APP is configured to perform authentication on the UE according to the UE authentication information;
   wherein the UE authentication information comprises a token parameter and a session identifier (ID), and the comparing of the uplink message with the UE authentication information comprises:
   comparing profile identifier (profile ID) information in the uplink message with the UE authentication information, and if corresponding flow information is found through comparing, determining that the uplink message matches the UE authentication information;
   wherein the sending, by the UPF device, the uplink message that comprises the UE authentication information to a first APP comprises:
   sending, by the UPF device, the uplink message that comprises the token parameter and the session ID to a mobile edge platform (MEP), and forwarding, by the MEP to the first APP, the token parameter and the session ID that are obtained by parsing a tunnel header, wherein the uplink message comprises the token parameter and the session ID in a tunnel header enrichment manner of mobile edge computing (MEC).

6. The UPF device according to claim 5, wherein the communications circuit is configured to obtain UE authentication information obtained by the SMF from an authentication center, wherein the UE authentication information comprises an MSISDN parameter; or
   the communications circuit is configured to obtain UE authentication information obtained by the SMF from a second APP; or the communications circuit is configured to obtain UE authentication information that is obtained by the SMF from an operation support system (OSS), wherein the UE authentication information comprises at least an MSISDN parameter.

7. A non-transitory computer readable medium storing computer instructions, wherein the computer instructions, when executed by one or more processors, cause the one or more processors to:
   receive user equipment (UE) authentication information sent by a session management function (SMF);
   compare a received uplink message of UE with the UE authentication information; and
   if the received uplink message of the UE matches the UE authentication information, sending, by the UPF device, the uplink message that comprises the UE authentication information to a first application (APP), wherein the first APP performs authentication on the UE according to the UE authentication information;

wherein the UE authentication information comprises a token parameter and a session identifier (ID), and the comparing of the received uplink message with the UE authentication information comprises:

comparing profile identifier (profile ID) information in the uplink message with the UE authentication information, and if corresponding flow information is found through comparing, determining that the uplink message matches the UE authentication information;

wherein the sending the uplink message that comprises the UE authentication information to a first APP comprises:

sending, by the UPF device, the uplink message that comprises the token parameter and the session ID to a mobile edge platform (MEP), and forwarding, by the MEP to the first APP, the token parameter and the session ID that are obtained by parsing a tunnel header, wherein the uplink message comprises the token parameter and the session ID in a tunnel header enrichment manner of mobile edge computing (MEC).

8. The non-transitory computer readable medium of claim 7, wherein the UE authentication information comprises a Mobile Station International Subscriber Directory Number (MSISDN) parameter, and the UE authentication information is obtained by the SMF from an authentication center; or the UE authentication information is obtained by the SMF from a second APP.

9. The non-transitory computer-readable medium of claim 7, wherein the UE authentication information comprises at least an MSISDN parameter, and the UE authentication information is configured by an operation support system (OSS) and is obtained by the SMF from the OSS.

* * * * *

UNITED STATES PATENT AND TRADEMARK OFFICE
CERTIFICATE OF CORRECTION

| | | |
|---|---|---|
| PATENT NO. | : 11,765,584 B2 | Page 1 of 1 |
| APPLICATION NO. | : 17/010055 | |
| DATED | : September 19, 2023 | |
| INVENTOR(S) | : Liping Yuan et al. | |

It is certified that error appears in the above-identified patent and that said Letters Patent is hereby corrected as shown below:

In the Claims

In Column 15, Lines 21-22, in Claim 1, delete "comprises;" and insert -- comprises: --.

In Column 16, Line 14, in Claim 5, delete "SMF" and insert -- SMF, --.

In Column 16, Line 57, in Claim 7, delete "computer readable" and insert -- computer-readable --.

In Column 18, Line 5, in Claim 8, delete "computer readable" and insert -- computer-readable --.

Signed and Sealed this
Twenty-first Day of November, 2023

Katherine Kelly Vidal
*Director of the United States Patent and Trademark Office*